US012434500B2

(12) United States Patent
Patel

(10) Patent No.: US 12,434,500 B2
(45) Date of Patent: Oct. 7, 2025

(54) STAPLING UNIT WITH AN IMPROVED STITCHING HEAD DRIVE APPARATUS

(71) Applicant: Udaykumar Chhabildas Patel, Gujarat (IN)

(72) Inventor: Udaykumar Chhabildas Patel, Gujarat (IN)

(*) Notice: Subject to any disclaimer, the term of this patent is extended or adjusted under 35 U.S.C. 154(b) by 0 days.

(21) Appl. No.: 18/722,338

(22) PCT Filed: Dec. 19, 2022

(86) PCT No.: PCT/IN2022/051096
§ 371 (c)(1),
(2) Date: Jun. 20, 2024

(87) PCT Pub. No.: WO2023/119319
PCT Pub. Date: Jun. 29, 2023

(65) Prior Publication Data

US 2025/0083466 A1 Mar. 13, 2025

(30) Foreign Application Priority Data

Dec. 20, 2021 (IN) ............................ 202121059471

(51) Int. Cl.
*B42B 4/02* (2006.01)
*B42B 2/02* (2006.01)

(52) U.S. Cl.
CPC ..................................... *B42B 4/02* (2013.01)

(58) Field of Classification Search
CPC .................................. B42B 4/02; B42B 2/02
USPC ...................... 412/1, 6, 9, 11, 14, 25, 33, 35
See application file for complete search history.

(56) References Cited

U.S. PATENT DOCUMENTS

| | | | | |
|---|---|---|---|---|
| 4,049,180 | A | 9/1977 | Hause | |
| 2019/0321998 | A1* | 10/2019 | Patel | B27F 7/17 |

FOREIGN PATENT DOCUMENTS

| | | | |
|---|---|---|---|
| EP | 0013163 | A1 | 7/1980 |
| EP | 3538375 | B1 | 10/2020 |
| GB | 617031 | A | 1/1949 |

* cited by examiner

*Primary Examiner* — Justin V Lewis
(74) *Attorney, Agent, or Firm* — Hayes Soloway P.C.

(57) ABSTRACT

A stapling unit with an improved stitching head drive apparatus includes a bunch sensor that senses the absence of the bunch of sheets and send a signal to the PLC, which actuates a lever operating device. The lever operating device opens the toggle lever by pushing the toggle release lever to disengage the driving lever from the pivot lever. The disengagement of the toggle lever with the pivot lever and the driving lever results in free pivotal movement of the pivot lever and the driving lever will not transfer the motion to the shaft which is responsible to drive the stitching head. Thus, the controllable movement of the stitching head results in improved cycle time of machine and minimum rejection.

7 Claims, 7 Drawing Sheets

STAPLING UNIT WITH AN IMPROVED STITCHING HEAD DRIVE APPARATUS

CROSS-REFERENCE TO RELATED APPLICATIONS AND PRIORITY

This patent application claims priority from PCT Application No. PCT/IN2022/051096 filed Dec. 19, 2022, which claims priority from Indian Patent Application number 202121059471 filed Dec. 20, 2021.

FIELD OF INVENTION

The present invention relates to a stapling unit for binding bunch of sheets to form a book and more particularly it relates to stapling unit with an improved stitching head drive apparatus for quick & quality operation and also reduction in rejection of staple pins.

BACKGROUND OF THE INVENTION

Books, including magazines, are composed of signatures which simply folded sheets are bearing the printed matter. The signature may present pages of the usual kind, or it may be a special size insert. The individual signatures which compose the book are fed from corresponding hoppers or so-called pockets and the signatures for each book are eventually collected one a top another, or one aside another as the case may be, on a conveyor and are transported by the conveyor to a station in the machine where the signatures are joined into a book by stitching with staples or by gluing, depending on how the book is bound.

The books presented to the binding machine have variable thicknesses. Therefore, the binding machine must be capable of handling the variable book thicknesses. If, for example, the books are being stitched, the stitcher heads must apply proper compression to the saddle of the books. If there is too much compression, there will be a bulge in the backbone of the stitched book while if there is too little compression, the staple will be loose.

Conventionally as shown in FIG. 1, a staple head drive is operated through an eccentric mechanism which comprises an eccentric flange (1), a link (2) which couples the eccentric flange (1) with the lever mechanism (3) pivoted at a stitching head shaft (4). The eccentric is a circular disk solidly fixed to a rotating axle with its centre offset from that of the axle. It converts rotary motion into linear reciprocating motion to drive a lever. The attached eccentric rod is suspended in such a way that its other end can impart the required reciprocating motion. By virtue of eccentric design of the conventional method, a stitching head (5) was moving as per eccentric path which leads to inadequate timing of staple pin operation and affecting the quality of the end product i.e. notebook, book or magazine.

The main drawback associated with the conventional stitcher drive mechanism is that the movement as per eccentric path leads to delay in staple pin operation timing and affecting staple pining quality. This technique does not lend itself to high speed production (on the order of five books per second). Also, this method produces staples of improper length.

In order to overcome the above said problem of conventional eccentric method, stapling mechanism needs an innovative solution which overcomes all above problem and maintains the functionality of the machine which will lead to easy and quick in operation with minimum ejection of staple pining into book as well as improvement in the quality of staple pining.

OBJECT OF INVENTION

The main object of the present invention is to provide a stapling unit with an improved stitching head drive apparatus which will provide controllable movement of stitching head.

Another object of the present invention is to provide a stapling unit with an improved stitching head drive apparatus which will minimize the rejection of the staple pining.

Further object of the present invention is to provide a stapling unit with an improved stitching head drive apparatus which will result in improved cycle time of machine.

Another object of the present invention is to provide a stapling unit with an improved stitching head drive apparatus which will result in quick and quality operation of staple pining.

One more object of the present invention is to provide a stapling unit with an improved stitching head drive apparatus that is free from the drawbacks of the conventional eccentric mechanism.

BRIEF DESCRIPTION OF DRAWINGS

Other objects, advantages and novel features of the invention will become apparent from the following detailed description of the present embodiment when taken in conjunction with the accompanying drawings.

SUMMARY OF INVENTION

The present invention relates to a stapling unit with an improved stitching head drive apparatus. In the present invention, a bunch sensor senses the absence of the bunch of sheets and send the signal to the PLC which actuates a lever operating device. The lever operating device open the toggle lever by pushing the toggle release lever to disengage the driving lever from the pivot lever. The disengagement of the toggle lever with the pivot lever and the driving lever results in free movement of the pivot lever on pivot and the driving lever will not transfer the motion to the shaft which is responsible to drive the stitching head. Thus, the present invention provides controllable movement of the stitching head resulting in improved cycle time of machine and minimum rejection.

DETAILED DESCRIPTION OF THE INVENTION

Before explaining the present invention in detail, it is to be understood that the invention is not limited in its application to the details of the construction and arrangement of parts illustrated in the accompany drawings. The invention is capable of other embodiments, as depicted in different figures as described above and of being practiced or carried out in a variety of ways. It is to be understood that the phraseology and terminology employed herein is for the purpose of description and not of limitation.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is to be also understood that the term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Figure 1:
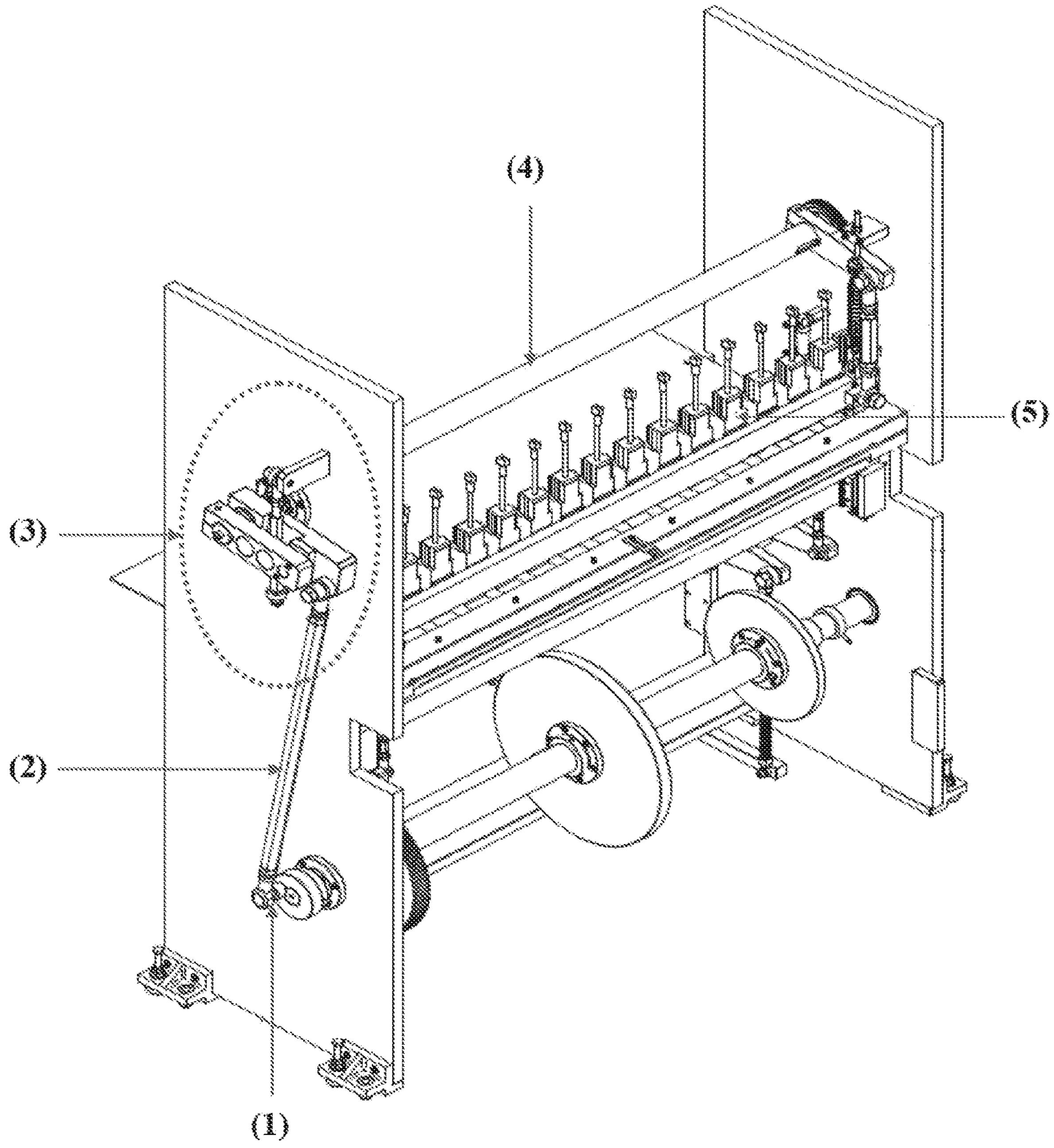
FIG. 1 shows a perspective view of conventional staple pin head drive with eccentric mechanism.
Figure 2A:
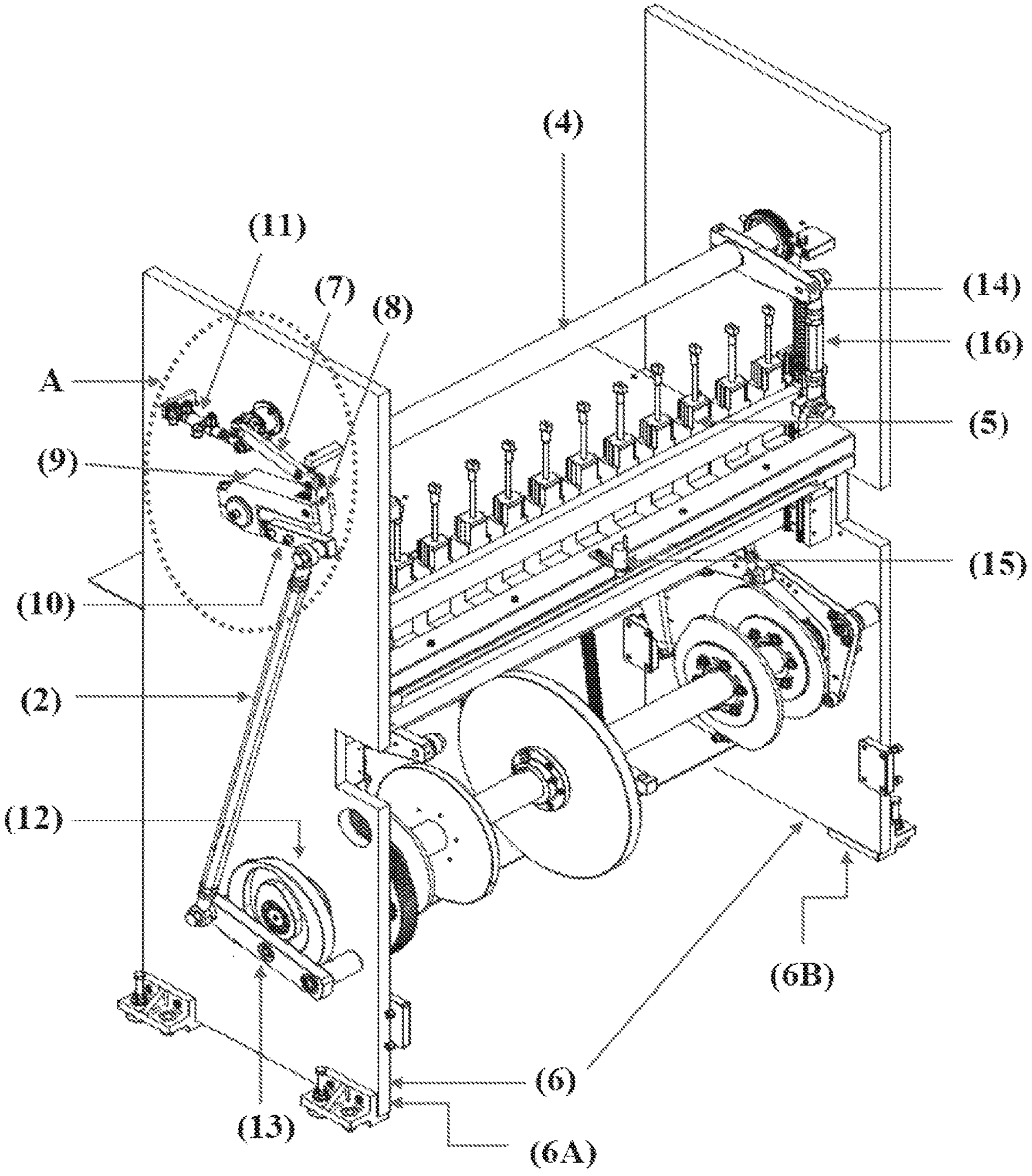
FIG. 2A shows a perspective view of a stitching unit with stitching head drive apparatus through CAM (bunch sensor signal to pneumatic cylinder) according to present invention.
Figure 3A:
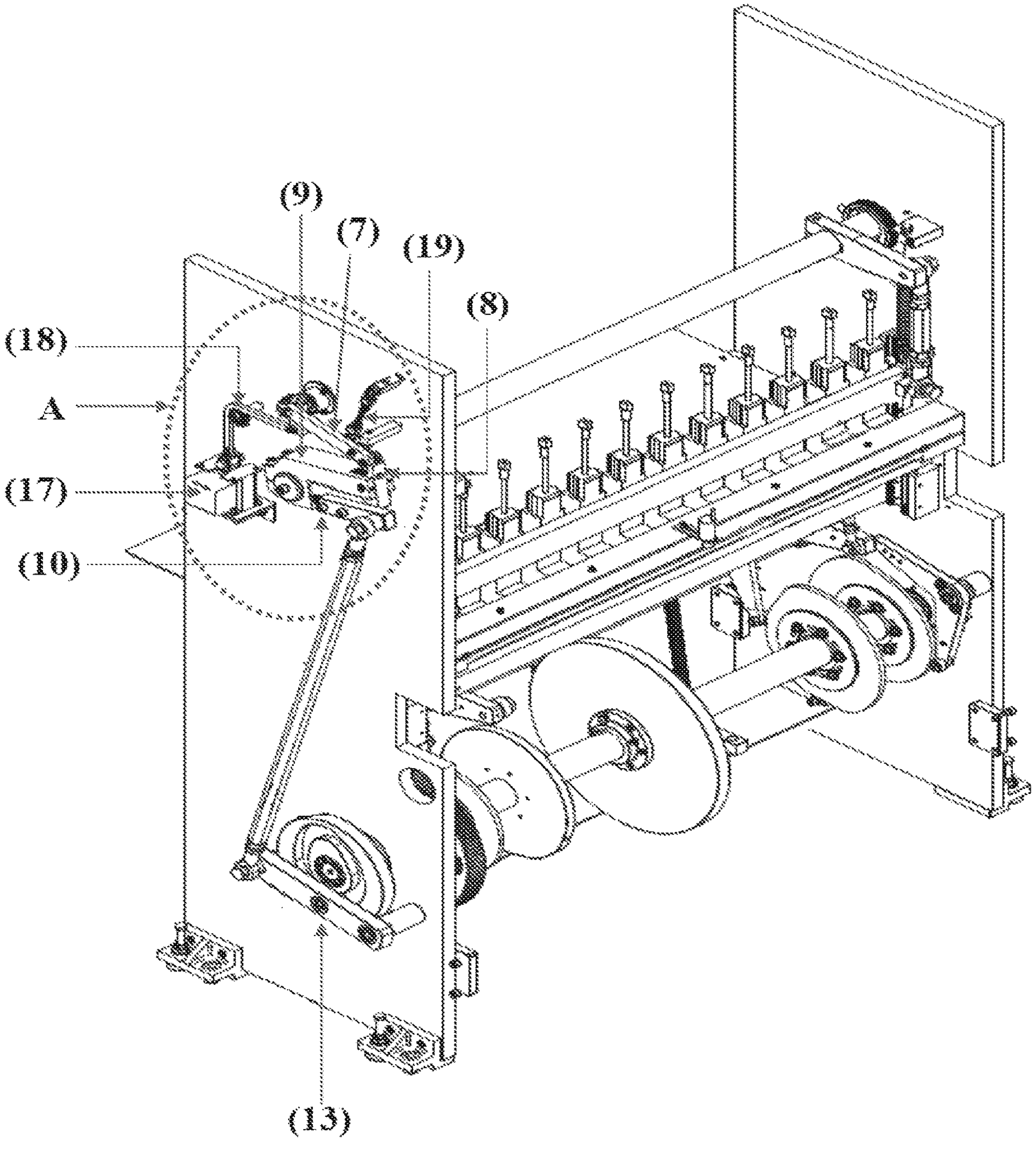
FIG. 3A shows a perspective view of a stitching unit with stitching head drive apparatus through CAM (bunch sensor signal to electrical actuator) according to present invention.

Now, according to exemplary embodiment as illustrated in FIGS. 2A and 3A, a stapling unit according to present invention comprises a frame (6) having plates (6A, 6B) located space apart, a plurality of linearly arranged rotatable wire spools (not shown) supported by the frame (6) and wherein stapling material (not shown), for example, wire is wound, a plurality of stitching heads (5) linearly arranged between the plates (6A, 6B) wherein wires (not shown) extended from the respective spools are properly threaded therein, a stitching clincher assembly (not shown) disposed on the opposite side of the stitching head (5) to support a bunch of sheets and a stitching head drive apparatus located either side of the plate (6A) for driving the stitching heads (5).

Said staple wire (not shown) is preferably made of metal. Said wire spools (not shown) are rotated with respect to an elongated spindle being longitudinally and centrally extended through the wire spools (not shown) when the wire is pulled. Said wires are fed vertically and parallelly downward from respective wire spools by passing through their corresponding guide channel (not shown).

Further, the stitching head (5) is perpendicularly applied on the bunch of sheets along the conveying path of the sheets so that the bunch of sheets is stapled from above. Each of the stitching head (5) comprises a staple-forming and driving mechanism for advancing said wire (not shown) therethrough along the longitudinal axis thereof and performing stapling operation upon the pulled wire (not shown) received from respective wire pulling roller (not shown). The sheets to be stitched are positioned beneath the stitching head (5).

Now as shown in FIGS. 2A, 2B, 2C, 3A, 3B and 3C, the stapling unit with an improved stitching head drive apparatus according to the present invention comprises a lever operating device (A), a toggle release lever (7) being operatively connected with the lever operating device (A), a toggle lever (8) configured to open and close through the toggle release lever (7), a driving lever (9) rigidly keyed with a shaft (4), a pivot lever (10) being drivably connected to a CAM drive (12) through a link (2). Said pivot lever (10) is pivoted on bush (not shown). Further, the driving lever (9) and the pivot lever (10) both releasably coupled through the toggle lever (8). Said toggle lever (8) engages and disengages the driving lever (9) and the pivot lever (10) in its close and open state respectively. Said shaft (4) is operatively connected with the driving lever (9) at its one end and a second end thereof is rotatably secured with the plate (6B). The shaft (4) is configured to lower down the stitching head (5) through a stitching head lever (14) and a connecting link (16) to perform stitching operation. Further, a bunch sensor (15) is located in proximity of a stitching area that is configured to sense the presence and absence of bunch of sheets to be stitched while the bunch of sheets is positioned under the stitching head (5). Further, the bunch sensor (15) is configured to send a signal to a PLC that operates the lever operating device (A).

Figure 2B:
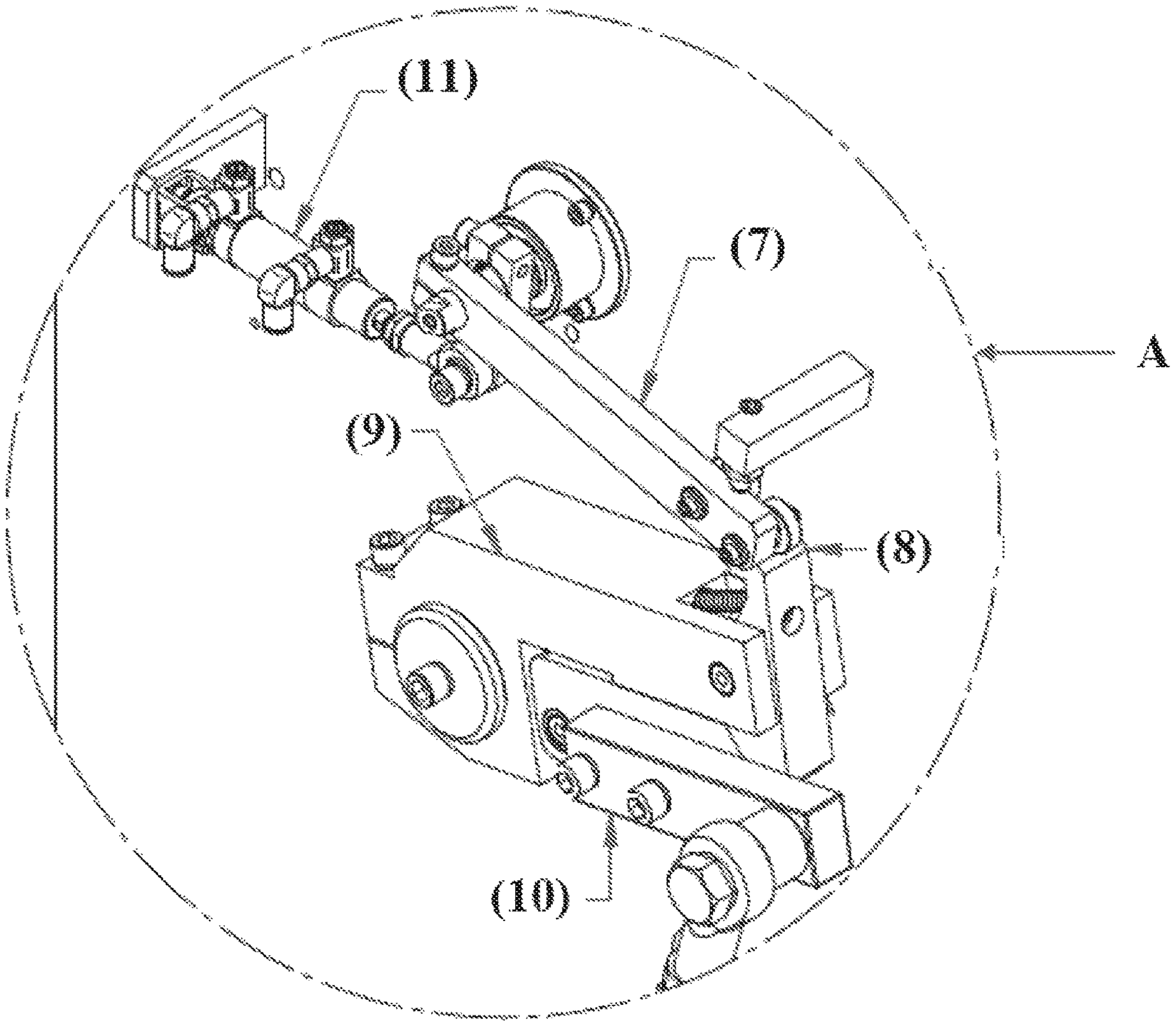
FIG. 2B shows a detailed view of lever operating device (A) according to present invention.
Figure 2C:
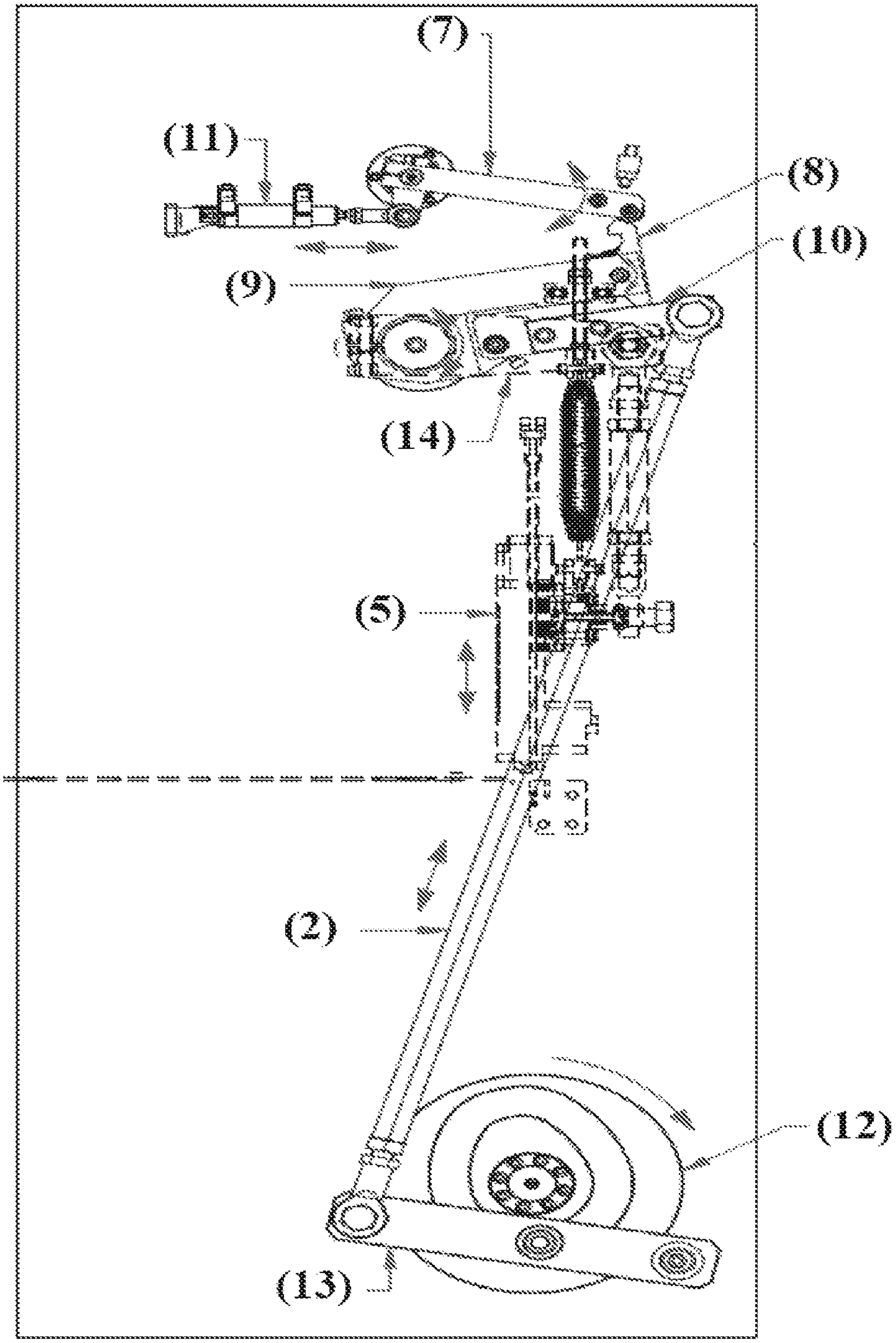
FIG. 2C illustrates a schematic view of the stitching head drive apparatus through CAM (bunch sensor signal to pneumatic cylinder) according to present invention.

Now as shown in FIGS. 2A, 2B and 2C, in accordance with the first embodiment, the lever operating device (A) comprises a pneumatic cylinder (11) that hydraulically operates the toggle release lever (7).

Figure 3B:
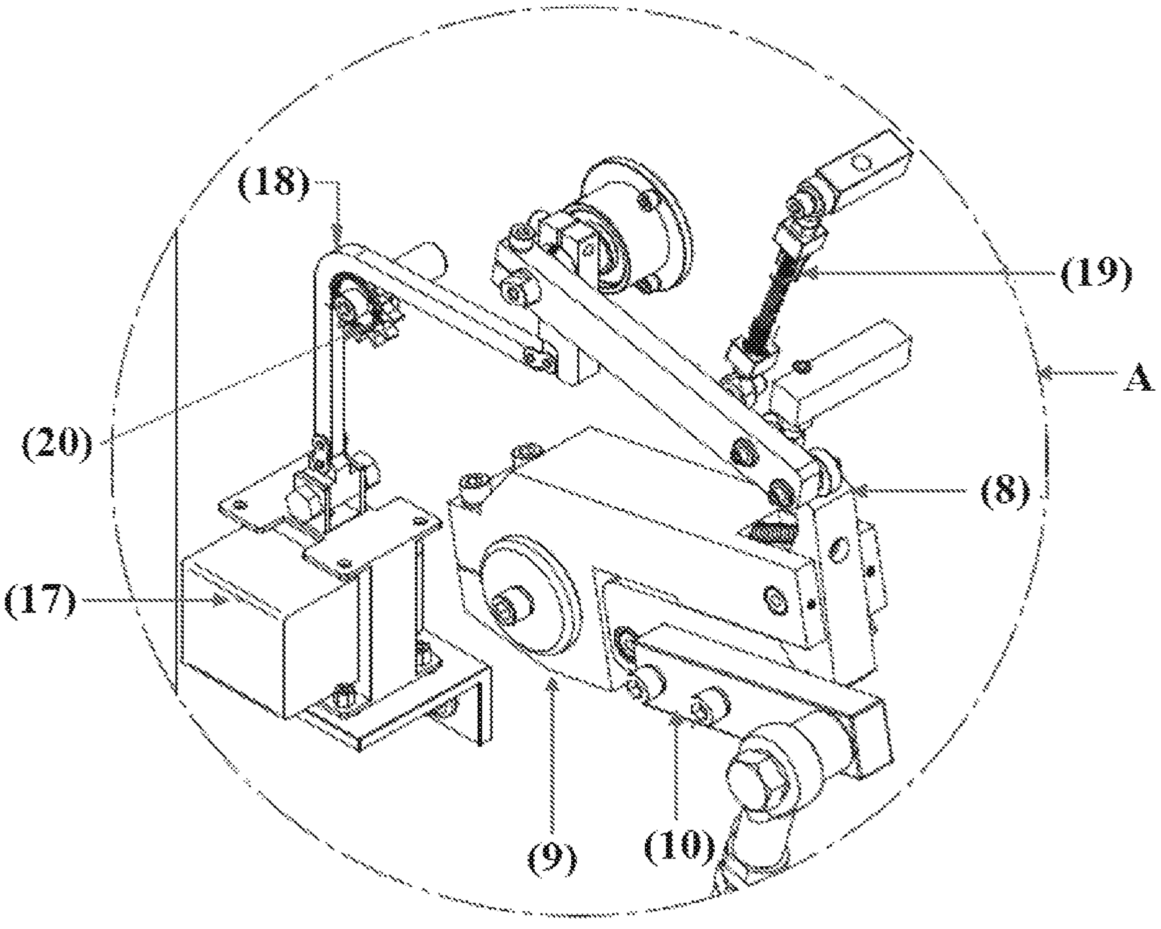
FIG. 3B shows a detailed view of lever operating device (A) according to present invention.
Figure 3C:
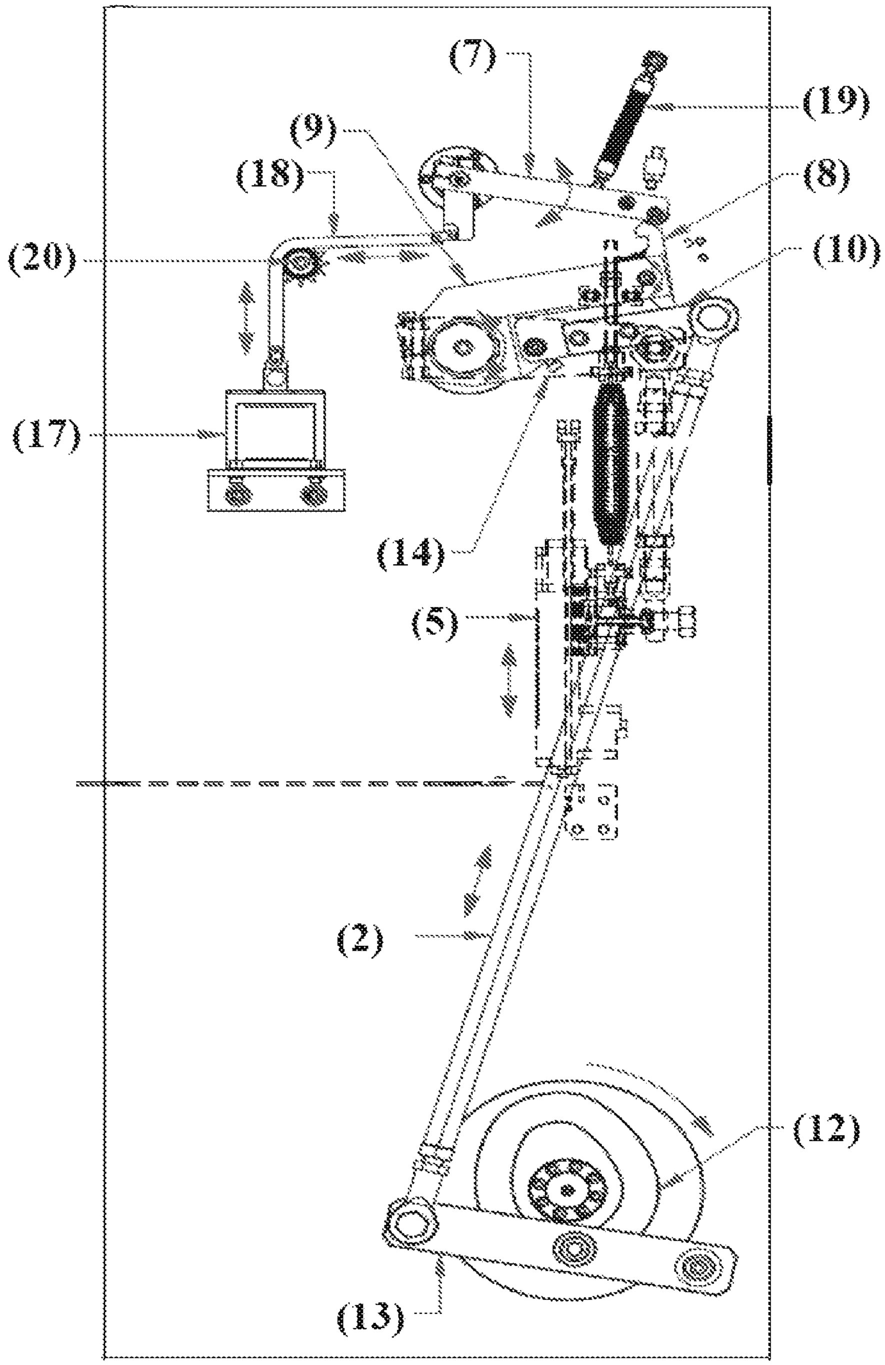
FIG. 3C illustrates a schematic view of the stitching head drive apparatus through CAM (bunch sensor signal to electrical actuator) according to present invention.

As shown in FIGS. 3A, 3B and 3C, in accordance with another embodiment, the lever operating device (A) comprises an electric actuator (17) operatively connected with the toggle release lever (7) by the means of a chain (18) and a sprocket (20). In this embodiment, a support spring (19) is attached with the plate (6A) at its one end and is attached with the toggle release lever (7) at its second end.

In the operation for driving the stitching head (5) in accordance with the present invention, the bunch of the sheets travel on the bunch conveyor and being stopped by mechanical stopper at stapling unit. Initially, the bunch of sheets is positioned below the stitching head (5). In such circumstances, the toggle lever (8) engages the driving lever (9) and the pivot lever (10). The CAM drive (12) operates the pivot lever (10) through the link (2). Now, due to the coupling of both, the pivot lever (10) and the driving lever (9) through the toggle lever (8), the driving lever (9) operates the shaft (4) which lowers down the stitching head (5) through the stitching head lever (14) and the connecting link (16).

When the stitching head (5) lower downs, penetration of staple pin in bunch of sheets is obtained. Such movement of the stitching head (5) will result in accurate penetration of staple pin in the bunch of sheets. Also at the same time, the clincher assembly (not shown) lifts upward through a CAM (not shown). This will result in perfect closing of staple pin on bunch of sheets.

Now, in circumstances of absence of the bunch of sheets, the bunch sensor (15) will send the signal to the PLC which actuates the lever operating device (A). Then the lever operating device (A) will push the toggle release lever (7) to open the toggle lever (8).

Now immediately when the toggle lever (8) gets open, the pivot lever (10) will no longer remain in contact with the driving lever (9) and hence, the pivot lever (10) will move freely on pivot as usual. But due to disengagement of the toggle lever (8), the motion will not transfer to the shaft (4) through the driving lever (9) which is responsible to drive the stitching head (5). In such condition, the stitching head (5) will not move downward. Hence, no pining action will take place.

This mechanism of the stitching head drive apparatus perform easy and quick operation of staple pining into the book. This system can able to control the movement of the stitching head (5) by designing rise and dwell of CAM as per requirement of stopping, pining and movement of book in precise manner. By synchronizing all operation through CAM design, cycle time of machine has improved. The staple pining operation becomes quick and rejection is minimized which results in improved quality of end product. Wearing of the stitching head bottom with book also avoided which resulted into improved stitching head life.

The invention has been explained in relation to specific embodiment. It is inferred that the foregoing description is only illustrative of the present invention and it is not intended that the invention be limited or restrictive thereto. Many other specific embodiments of the present invention will be apparent to one skilled in the art from the foregoing disclosure. All substitution, alterations and modification of the present invention which come within the scope of the following claims are to which the present invention is readily susceptible without departing from the spirit of the invention. The scope of the invention should therefore be determined not with reference to the above description but should be determined with reference to appended claims along with full scope of equivalents to which such claims are entitled.

LIST OF REFERENCE NUMERALS

Eccentric flange (1)
Link (2)
Lever mechanism (3)
Shaft (4)
Stitching head (5)
Frame (6)
Plates (6A, 6B)
Toggle release lever (7)
Toggle lever (8)
Driving lever (9)
Pivot lever (10)
Pneumatic cylinder (11)
CAM Drive (12)
Follower lever (13)
Stitching head lever (14)
Bunch sensor (15)
Connecting link (16)
Electric actuator (17)
Chain (18)
Support Spring (19)
Sprocket (20)

I claim:

1. A stapling unit with an improved stitching head drive apparatus, the stapling unit comprising:

a frame having at least two plates spaced apart, the at least two plates comprising a first plate and a second plate;

a plurality of linearly arranged rotatable wire spools supported by the frame;

a plurality of stitching heads linearly arranged between the at least two plates, a plurality of wires extending from the rotatable wire spools threaded therein;

a stitching head shaft secured between the at least two plates and configured to operate the plurality of stitching heads through a stitching head lever and a connecting link;

a stitching clincher assembly disposed on an opposite side of the stitching heads to support a plurality of sheets and a stitching head drive apparatus located on either side of the first plate for driving the plurality of stitching heads;

the stitching head drive apparatus comprises:

a toggle lever, a driving lever and a pivot lever, the pivot lever releasably coupled with the driving lever through the toggle lever, the driving lever rigidly keyed with the stitching head shaft;

a lever operating device;

a toggle release lever comprising a first end and a second end, the toggle release lever operatively connected with the lever operating device at the first end and connected to the toggle lever at the second end;

a cam drive configured to operate the pivot lever through a link;

the lever operating device configured to push the toggle release lever to open the toggle lever; and the toggle lever configured to open and close through the toggle release lever; the toggle lever engageable with the driving lever and the pivot lever in a closed state and an open state, respectively.

2. The stapling unit with an improved stitching head drive apparatus as claimed in claim 1, wherein a bunch sensor is located in proximity of the stitching head that is configured to sense at least one of a presence and an absence of the plurality of sheets to be stitched.

3. The stapling unit with an improved stitching head drive apparatus as claimed in claim 1, wherein a bunch sensor is configured to send a signal to a programmable logic controller that operates the lever operating device.

4. The stapling unit with an improved stitching head drive apparatus as claimed in claim 3, wherein the lever operating device comprises a pneumatic cylinder hydraulically configured to push the toggle release lever.

5. The stapling unit with an improved stitching head drive apparatus as claimed in claim 3, wherein the lever operating device comprises an electric actuator operatively connected with the toggle release lever by a chain and a sprocket.

6. The stapling unit with an improved stitching head drive apparatus as claimed in claim 1, wherein a support spring is attached with the first plate at one end and is attached with the toggle release lever at a second end.

7. A method for operating a stapling unit with an improved stitching head drive apparatus comprising the following steps:

a. positioning a plurality of sheets below a stitching head;
b. operating a pivot lever through a cam drive;
c. operating a shaft through a driving lever resulting in a lowering of the stitching head through a stitching head lever;
d. applying a staple pin on the plurality of sheets through the stitching head;

wherein;

e. sensing an absence of the plurality of sheets through a bunch sensor and sending a signal for actuating a lever operating device results in disengagement of a toggle lever through a toggle release lever;
f. releasing contact of the pivot lever with the driving lever by disengaging the toggle lever stopping movement of the shaft responsible in driving the stitching head.

* * * * *